Patented Nov. 9, 1943

UNITED STATES PATENT OFFICE 2,333,782

ALPHA, BETA'-DICYANO DIETHYL ETHER

Virgil L. Hansley, Niagara Falls, N. Y., assignor to E. I. du Pont de Nemours & Company, Wilmington, Del., a corporation of Delaware No Drawing. Application April 14, 1941, Serial No. 388,525

1 Claim. (Cl. 260—464)

This invention relates to the synthesis of cyano ethers and has for an object the preparation of cyano ethers having two cyano groups.

Dicyano ethers are prepared in accordance with the present invention by reacting cyanhydrins with alpha, beta-unsaturated aliphatic nitriles, for example, acrylonitrile. The reactions are carried out by mixing the cyanhydrin and unsaturated nitrile, either with or without the use of solvent, in the presence of an alkaline catalyst. The reactions are exothermic and may be carried out over a wide range of temperatures. In most cases it is preferable to warm the reactants to a temperature of 50-100° C., in order to carry out the reaction at a suitable speed. However, the reaction will occur at lower temperatures, e. g., at room temperature, although more slowly. Preferably, the reaction mixture is cooled to keep the temperature within desired limits, e. g., at 50-100° C.

Any material either organic or inorganic, which has a distinctly alkaline character may be used as a catalyst for the reaction. Alkali and alkaline earth metals and their alkaline compounds, for example, are suitable as catalysts. Thus suitable catalysts are alkali metal alcoholates, such as sodium ethylate or sodium methylate; cyanides such as sodium cyanide, potassium cyanide or calcium cyanide, or hydroxides and oxides of the alkali-forming metals, such as caustic soda, caustic potash and lime. In addition to the inorganic alkalis, it is found that trialkyl amines are suitable as catalysts; for example, triethylamine, trimethylamine and tributylamine have proved satisfactory.

The unsaturated nitriles which are suitable for practicing this invention are those wherein the cyano group of the nitrile is joined to an aliphatic hydrocarbon radical having a double bond (ethylenic) linkage between the carbons alpha and beta to the cyano group, said nitrile being otherwise free from aliphatic unsaturation, either ethylenic or acetylenic. In other words, the nitriles suitable for this invention may include acrylonitrile and derivatives thereof formed by substituting one or more of the hydrogen atoms of acrylonitrile with alkyl, aryl, aralkyl or cycloalkyl radicals, all such aliphatic radicals being saturated. Examples of suitable nitriles are: acrylonitrile, methacrylonitrile, crotononitrile, α-phenyl-acrylonitrile, β-phenylacrylonitrile, tiglonitrile,

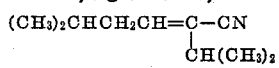

α isopropyl-β isobutyryl acrylonitrile and

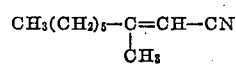

β-n-hexyl crotonyl nitrile

Example I 42.5 g. of vinyl cyanide and 3 cc. of tributylamine were mixed in a flask and heated to reflux under agitation. Then 45.5 g. of stabilized glycolonitrile (formaldehyde cyanhydrin) was added from a dropping funnel. The temperature was kept at 80-90° for ¾ hour. Upon acidifying with phosphoric acid and distilling in a vacuum, cyanomethyl betacyanoethyl ether was obtained, B. P. 125°/5 mm. Physical constants were determined as follows:

| Refractive index | Density |
|---|---|
| $n^{20}_D = 1.4365$ | $D^{25} = 1.066$ |

Molecular refraction: $M_D = 26.44$ (calc'd); 27.00 (found).

Example II

A mixture of 53 g. vinyl cyanide and 0.5 g. sodium hydroxide were put in a flask and heated to reflux. Then 71 g. of lactonitrile was added slowly through the dropping funnel. The temperature was kept at about 90° C. for ½ hour and then allowed to fall to room temperature. The alkaline catalyst was neutralized with phosphoric acid and the mixture fractionated at a pressure 20 mm. of Hg. Half of the lactonitrile was recovered at 90° and the high boiling material (above 110°) was collected as the desired product. This was redistilled at the same pressure and the fraction boiling at 150-5°/20 mm. collected as α, β'-dicyano diethyl ether. Physical constants were determined to be the following:

| Refractive index | Density |
|---|---|
| $n^{20}_D = 1.4331$ | $D^{27.5} = 1.041$ |

Molecular refraction: $M_D = 31.06$ (calc'd); 30.97 (found).

Example III 35 grams of ethylene cyanhydrin, 27 grams acrylonitrile, and 0.5 gram KCN were reacted by heating the acrylonitrile and KCN to 80° C. and adding the cyanhydrin dropwise. Heat was evolved during this addition which required 10 minutes. The reaction mixture was then neutralized with dilute sulfuric acid and the product vacuum distilled. There was obtained 46.5 grams of product distilling at 150-155° C. at 4 mm., which was the β,β'-dicyano diethyl ether in 75% yield.

I claim:

As a new composition of matter, alpha, beta'-dicyano diethyl ether.

VIRGIL L. HANSLEY.